US007349853B2

(12) United States Patent
Hill

(10) Patent No.: US 7,349,853 B2
(45) Date of Patent: Mar. 25, 2008

(54) METHOD AND SYSTEM FOR ROUTING HARDCOPY MAIL

(75) Inventor: Clark Thurston Hill, Newport, RI (US)

(73) Assignee: International Business Machines Corp., Armonk, NY (US)

( * ) Notice: Subject to any disclaimer, the term of this patent is extended or adjusted under 35 U.S.C. 154(b) by 821 days.

(21) Appl. No.: 09/966,247

(22) Filed: Sep. 28, 2001

(65) Prior Publication Data

US 2003/0065629 A1 Apr. 3, 2003

(51) Int. Cl.
*G06Q 10/00* (2006.01)

(52) U.S. Cl. .............................................. 705/1; 705/60

(58) Field of Classification Search .................... 705/1, 705/401, 408, 410, 60, 500
See application file for complete search history.

(56) References Cited

U.S. PATENT DOCUMENTS 4,868,757 A 9/1989 Gil ............................ 705/406
5,114,128 A 5/1992 Harris, Jr et al. .......... 270/1.03
5,422,821 A * 6/1995 Allen et al. ................. 700/219
5,667,078 A 9/1997 Walach ....................... 209/584
5,790,429 A * 8/1998 Baker et al. ................ 700/304
6,055,520 A 4/2000 Heiden et al. .............. 705/410
6,073,060 A 6/2000 Robinson .................... 700/223
6,108,656 A 8/2000 Durst et al. .................. 707/10
6,148,331 A 11/2000 Parry .......................... 709/218
6,549,892 B1 * 4/2003 Sansone ..................... 705/401
7,130,803 B1 * 10/2006 Couch et al. .................. 705/1

FOREIGN PATENT DOCUMENTS

EP 0710930 A2 * 5/1996

OTHER PUBLICATIONS

Mummert: "Boost your mail's delivery", Target Marketing, Nov. 1994, vol. 17, No. 11, pp. 32-36.*

* cited by examiner

*Primary Examiner*—John G. Weiss
*Assistant Examiner*—Traci L. Casler
(74) *Attorney, Agent, or Firm*—William E. Schiesser; Hoffman, Warnick & D'Alessandro LLC

(57) ABSTRACT

A method and system for routing hardcopy mail is provided. Specifically, a recipient is assigned a unique identifier. The recipient can electronically designate a mailing address to be associated with the assigned identifier. A sender wishing to send the recipient a piece of hardcopy mail can obtain the recipient's identifier and affix the same to the piece of hardcopy mail. The identifier will be read and the piece of hardcopy mail will be routed to the recipient at the mailing address associated therewith.

34 Claims, 7 Drawing Sheets

METHOD AND SYSTEM FOR ROUTING HARDCOPY MAIL

BACKGROUND OF THE INVENTION

1. Technical Field

The present invention generally relates to a method and system for routing hardcopy mail. More particular, the present invention relates to a method and system for electronically associating a mailing address with a unique identifier that is affixable to hardcopy mail.

2. Background Art

In today's business world, extensive travel is a common part of employment. Specifically, workers are now required to become increasingly mobile to perform their job functions. When mobile, however, the workers are faced with the issue of receiving mail on a consistent and accurate basis. For example, if a worker travels three weeks a month, he/she must often make arrangements to receive mail. If the mail is not received, the worker could be presented with various problems such as bills going unpaid.

Oftentimes, the process of changing a mailing address is both time consuming and aggravating. Specifically, to change a mailing address, one must typically contact each sender individually to report the change. This includes senders of both household mail such as utility companies, credit card companies, etc., as well as senders of personal mail such as friends and family. As such, it may take a worker several days to change the mailing address with all applicable senders. This is generally not practical since the worker could re-locate again before the change has been made with all parties.

Heretofore, attempts have been made at improving mail distribution and routing by providing various computerized systems. Such systems however, fail to provide an efficient mechanism for a recipient to change his/her mailing address with multiple senders. For example, the recipient might want to receive mail at one address on one day and at a second address on another day. This capability could be especially valuable in today's business environment where workers rarely spend an appreciable amount of time in any one location. Moreover, no existing system provides a way for a mailing address to be changed with multiple senders from one central location. As indicated above, an address change is typically accomplished by individually contacting each sender.

In view of the foregoing, there exists a need for a method and system for routing hardcopy mail. Specifically, there exists a need for a recipient to be assigned a unique identifier. Moreover, a need exists for a mailing address to be associated with the identifier. A further need exists for a sender to be able to obtain the identifier and affix it to a piece of hardcopy mail. Thus, when the identifier is read, the corresponding piece of hardcopy mail can be routed to the recipient at the associated address.

SUMMARY OF THE INVENTION

The present invention overcomes the drawbacks of the related art by providing a method and system for routing hardcopy mail. Specifically, under the present invention, a recipient is assigned a unique, machine readable identifier such as a bar code that should never change. The recipient can then electronically associate a mailing address with the identifier. A sender can obtain the identifier and affix it to a piece of hardcopy mail he/she desires to send the recipient. A postal worker or machine will read the identifier and route the piece of hardcopy mail to the associated mailing address. Thus, the present invention allows the recipient to easily change his/her mailing address for multiple senders from one central location.

According to a first aspect of the present invention, a method for routing hardcopy mail is provided. The method comprises the steps of: (1) providing a unique identifier for a recipient; (2) electronically associating a mailing address with the identifier; (3) affixing the identifier to a piece of hardcopy mail; and (4) routing the piece of hardcopy mail to the recipient at the associated mailing address.

According to a second aspect of the present invention, a method for routing hardcopy mail is provided. The method comprises the steps of: (1) providing a unique identifier for a recipient; (2) electronically associating a mailing address with the identifier; (3) affixing the identifier to a piece of hardcopy mail and submitting the piece of hardcopy mail to a machine; and (4) retrieving the mailing address to the machine, wherein the machine can read the identifier and route the piece of hardcopy mail to the recipient at the associated mailing address.

According to a third aspect of the present invention, a method for routing hardcopy mail is provided. The method comprises the steps of: (1) providing a unique identifier for a recipient; (2) electronically associating a mailing address with the identifier; (3) affixing the identifier to a piece of hardcopy mail; (4) electronically editing the associated mailing address; and (5) sending the edited mailing address to a machine, wherein the machine can read the identifier and route the piece of hardcopy mail to the recipient at the edited mailing address.

According to a fourth aspect of the present invention, a system for routing hardcopy mail is provided. The system comprises: (1) a recipient interface for electronically associating a mailing address with a unique identifier for a recipient; (2) a sender interface for outputting the identifier to a sender, wherein the identifier is affixable to a piece of hardcopy mail; and (3) a cross-reference system for outputting the associated mailing address to a machine, wherein the machine can read the identifier and route the piece of hardcopy mail to the recipient at the associated mailing address.

According to a fifth aspect of the present invention, a system for routing hardcopy mail is provided. The system comprises: (1) a recipient interface for electronically designating a mailing address for a recipient; (2) a sender interface for outputting a unique identifier corresponding to the recipient, wherein the identifier is affixable to a piece of hardcopy mail; and (3) a cross-reference system for outputting the designated mailing address to a machine in response to a request, wherein the machine reads the identifier and routes the corresponding piece of hardcopy mail to the recipient at the designated mailing address.

According to a sixth aspect of the present invention, a program product stored on a recordable medium for routing hardcopy mail is provided. When executed, the program product comprises: (1) program code configured to electronically associate a mailing address with a unique identifier for a recipient; (2) program code configured to output the identifier to a sender, wherein the identifier is affixable to a piece of hardcopy mail; and (3) program code configured to output the associated mailing address to a machine, wherein the machine can read the identifier and route the piece of hardcopy mail to the recipient at the associated mailing address.

Therefore, the present invention provides a method and system for routing hardcopy mail.

BRIEF DESCRIPTION OF THE DRAWINGS

These and other features and advantages of this invention will be more readily understood from the following detailed description of the various aspects of the invention taken in conjunction with the accompanying drawings in which.

Figure 1:
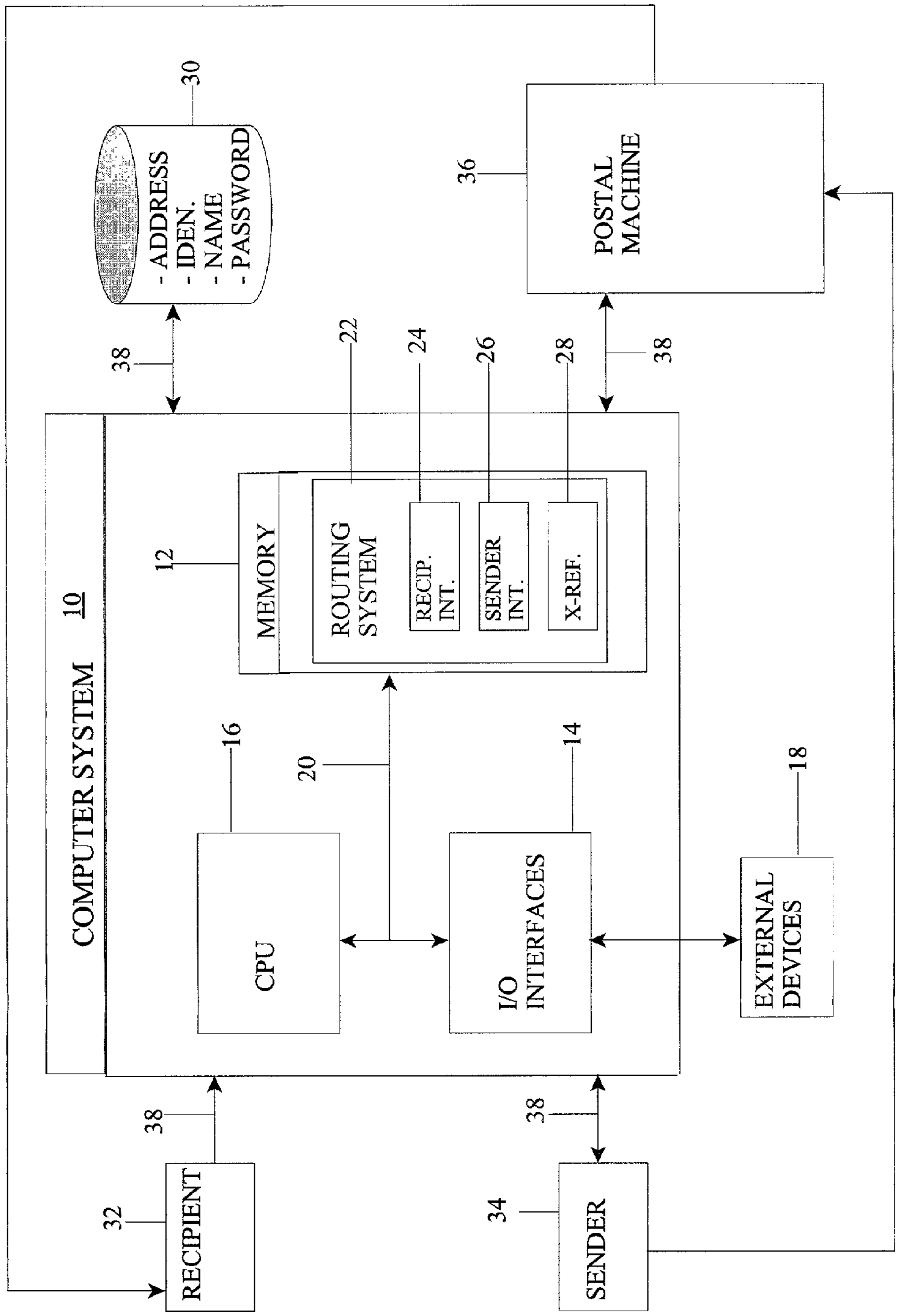
FIG. 1 depicts a computer system having a routing system according to the present invention.

It is noted that the drawings of the invention are not necessarily to scale.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE DRAWINGS

For convenience, the detailed description will have the following sections:

I. Definitions

II. Invention

I. Definitions

For the purposes of the present invention, the following terms will have to following meanings:

Identifier—a unique machine readable code that is assigned to a particular recipient.

Identifier Value—numbers, letters, or other values that correspond to an identifier.

Recipient—an individual or group of individuals that receives hardcopy mail.

Sender—an individual or group of individuals that sends hardcopy mail.

II. Invention

In general, the present invention provides a method and system for routing hardcopy mail. Specifically, a recipient will be assigned a unique identifier. The identifier preferably includes a machine readable code such as a bar code that has identifier values associated therewith. Moreover, the identifier is preferably assigned permanently, similar to a social security number, although a recipient should be able to request a new identifier should the need arise (e.g., fraud). The recipient will associate a mailing address with the assigned identifier. The associated address can be edited as frequently as desired by the recipient. A sender can send a piece of hardcopy mail to the recipient by obtaining the identifier and affixing it to the piece of mail. Once the identifier has been affixed, a postal machine will read the identifier, determine the current mailing address, and then route the piece of mail to the recipient at the mailing address.

Referring now to FIG. 1, computer system 10 is shown. Computer system 10 generally comprises memory 12, input/output interfaces 14, a central processing unit (CPU) 16, external devices/resources 18, bus 20, and database 30. Stored in memory 12 of computer system 10 is routing system 22 (shown in FIG. 1 as a software product). Routing system 22 will be described in more detail below but generally provides a method and system for routing hardcopy mail. Memory 12 may comprise any known type of data storage and/or transmission media, including magnetic media, optical media, random access memory (RAM), read-only memory (ROM), a data cache, a data object, etc. Moreover, memory 12 may reside at a single physical location, comprising one or more types of data storage, or be distributed across a plurality of physical systems in various forms. CPU 16 may likewise comprise a single processing unit, or be distributed across one or more processing units in one or more locations, e.g., on a client and server.

I/O interfaces 14 may comprise any system for exchanging information from an external source. External devices 18 may comprise any known type of external device, including a CRT, LED screen, hand-held device, keyboard, mouse, voice recognition system, speech output system, printer, facsimile, pager, personal digital assistant, cellular phone, web phone, etc. Bus 20 provides a communication link between each of the components in the computer system 10 and likewise may comprise any known type of transmission link, including electrical, optical, wireless, etc. In addition, although not shown, additional components, such as cache memory, communication systems, system software, etc., may be incorporated into computer system 10.

Database 30 provides storage for information necessary to carry out the present invention. Such resources could include, inter alia: (1) mailing addresses;

(2) identifiers; (3) recipient names; and (4) passwords. Database 30 may include one or more storage devices, such as a magnetic disk drive or an optical disk drive. In another preferred embodiment database 30 includes data distributed across, for example, a local area network (LAN), wide area network (WAN) or a storage area network (SAN) (not shown). Database 30 may also be configured in such a way that one of ordinary skill in the art may interpret it to include one or more storage devices.

Under the present invention, each potential recipient 32 of hardcopy mail will be assigned a unique, machine readable identifier such as a bar code. In a preferred embodiment, a recipient wishing to be assigned an identifier can log onto routing system via recipient interface 24 and electronically establish a new account. Once an identifier has been assigned, recipient 32 can then electronically associate a mailing address with the assigned identifier. Should recipient 32 desire to edit the associated mailing address, he/she could do so by logging onto routing system 24, via recipient interface 24, and electronically edit the stored mailing address.

Figure 2:
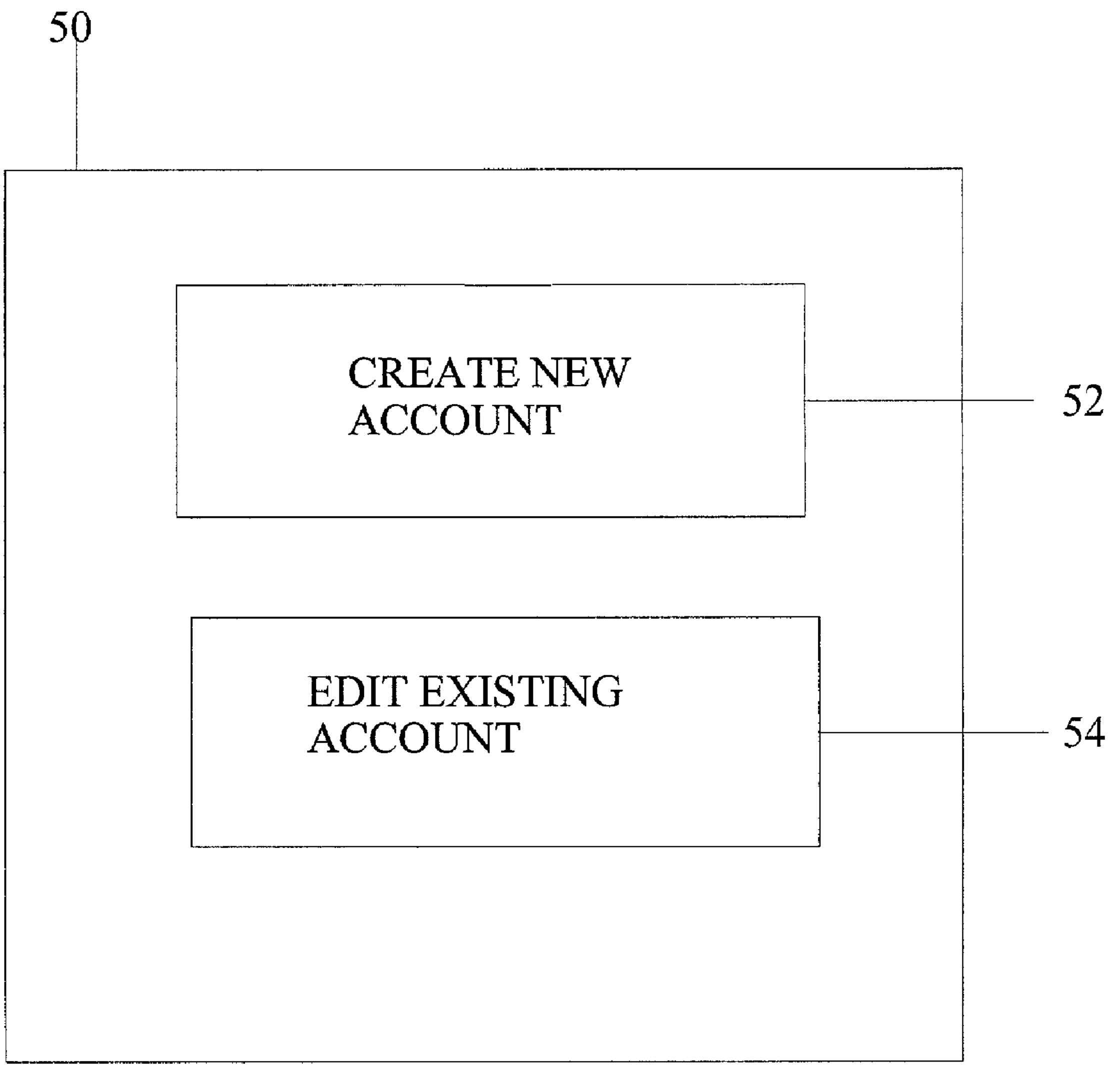
FIG. 2 depicts a log on screen of a recipient interface.

FIG. 2 depicts an exemplary log-on screen 50 of the recipient interface. As shown, the recipient is presented with two buttons, namely, create new account button 52 and edit existing account button 54. By selecting the create new account button 52, the recipient can be assigned a unique identifier and electronically designated an initial mailing address to be associated therewith. By selecting the edit existing account button 54, the recipient can electronically edit a previously designated mailing address.

Figure 3:
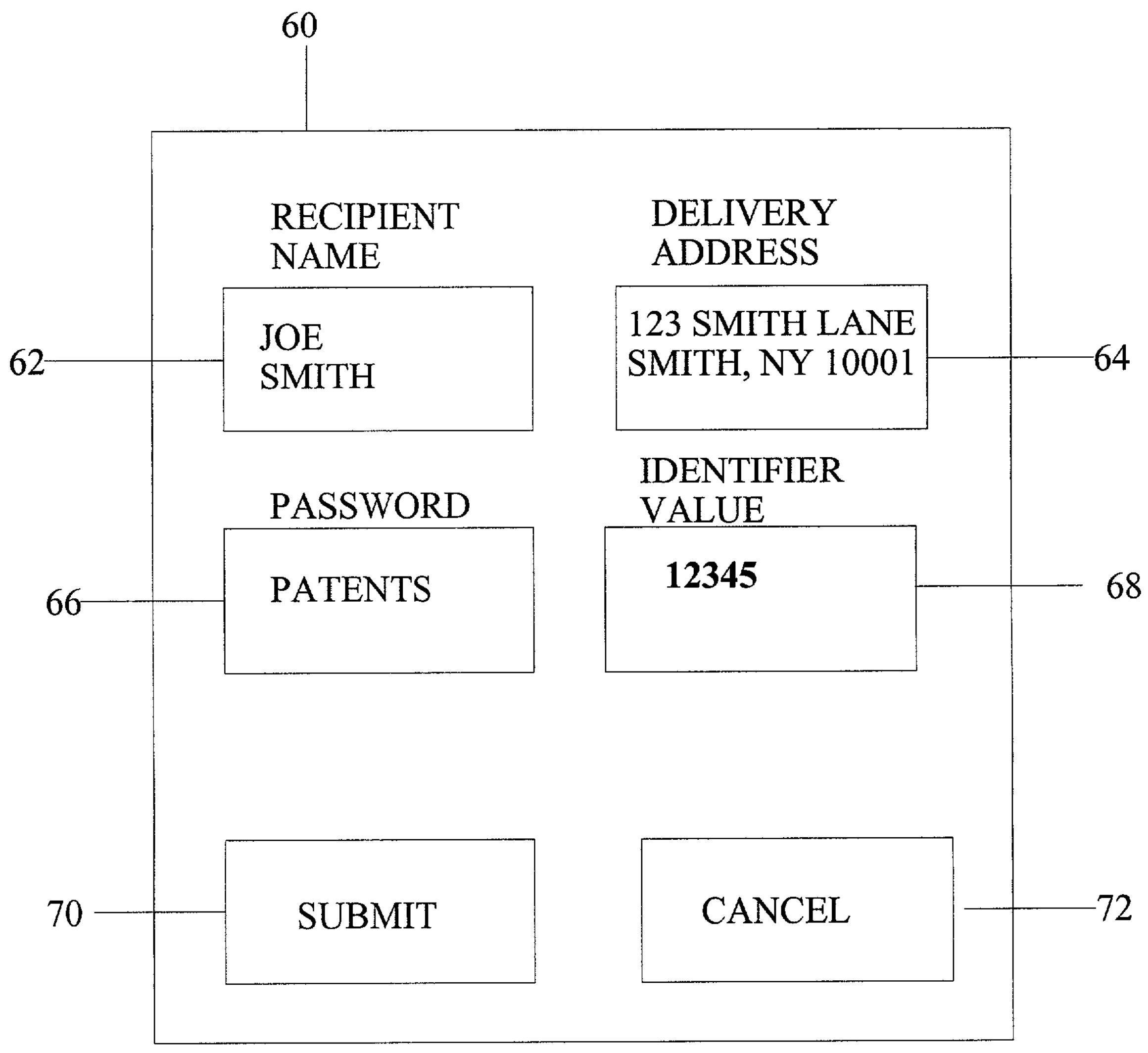
FIG. 3 depicts a new account screen of the recipient interface.

FIG. 3 depicts a new account screen 60 that is accessed upon selecting the create new account button 52 of FIG. 2. Specifically, a recipient desiring to be assigned an identifier will electronically enter his/her name into recipient name field 62, a mailing address into mailing address field 64, and a password into password field 66. Since the mail is a piece of hardcopy mail, the designated mailing address should be a physical postal address. Then, by selecting submit button 70, routing system will assign a unique identifier to the recipient and associate the designated mailing address with the assigned identifier. The identifier is preferable a machine readable code such as a bar code and preferably does not change. As known in the art, bar codes may have a value(s) (e.g. letters, numbers, etc.) corresponding thereto. This value is referred to herein as the identifier value that can be displayed for the recipient in identifier value field 68. Then, the assigned identifier (value) along with the designated information (i.e., recipient name, mailing address, and password) will be stored in the database in a table or similar format for future cross-referencing. For the example shown in FIG. 3, Mr. Joe Smith has designated a mailing address of "123 Smith Lane, Smith, NY 10001," a password of "patents," and has been assigned an identifier having a corresponding identifier value of "12345." If, prior to selecting submit button 70, the recipient wishes to cancel his/her request for an identifier, the recipient can do so by selecting cancel button 72.

Once a mailing address has been electronically associated with the identifier, senders seeking to send a piece of hardcopy mail to the recipient can log onto routing system, via the sender interface, and obtain a copy of the identifier corresponding to the recipient (as will be further described below). In the event the recipient wishes to change the designated mailing address, he/she can do so by selecting the edit existing account button of the log on screen 50. This allows the recipient to access the edit screen 80 shown in FIG. 4.

Figure 4:
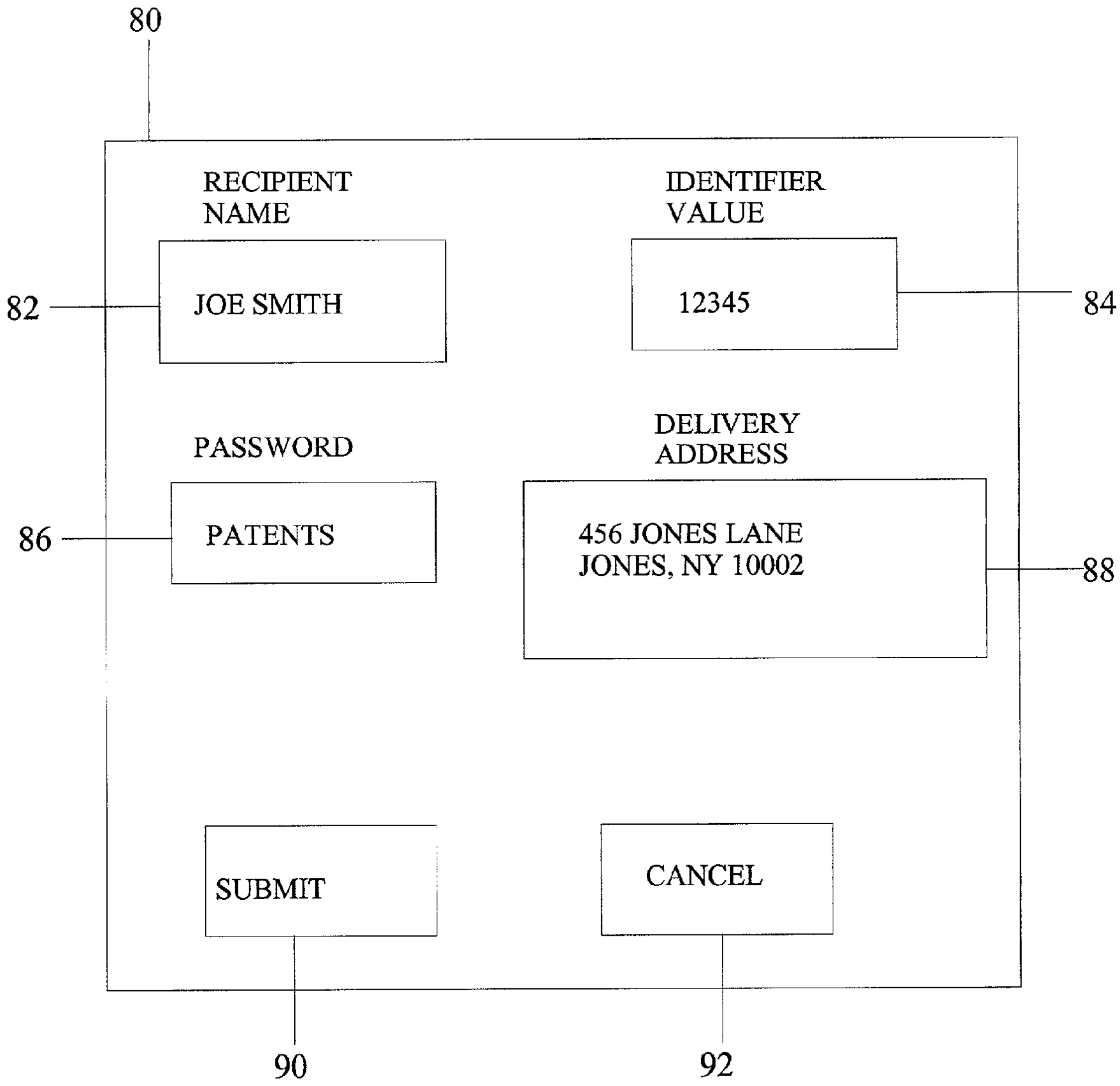
FIG. 4 depicts an edit screen of the recipient interface.

As shown in FIG. 4, edit screen 80 includes recipient name field 82, identifier value field 82, password field 86, mailing address field 88, submit button 90, and cancel button 92. A recipient seeking to electronically edit a previously designated mailing address will do so by entering his/her name into recipient name field 82, assigned identifier value into identifier value field 84, and/or password into password field 86. Then, the recipient can select the submit button 90. If the entered password, recipient name, and identifier value match, the previously entered mailing address will be retrieved from the database and displayed in mailing address field 88 for editing.

The use of recipient names, passwords, and identifier values in accessing the stored information provide multiple levels of security for the recipient. However, it should be appreciated that all such levels need not be provided. For example, the recipient need not be required to enter the password and/or identifier value. In any event, once the mailing address has been accessed, the recipient can edit as desired. As shown, Joe Smith has changed his designated mailing address to "456 Jones Lane, Jones, NY 10002." Once changed, the recipient can store the new mailing address in the database (i.e., associate the edited mailing address with the identifier) by selecting submit button 90. Conversely, if the recipient wishes to cancel any changes prior to association and storage, he/she can do so by selecting the cancel button 92.

It should be understood that the depiction of the recipient interface as well as the screens thereof are only intended to be illustrative. For example, the recipient may not be required to enter his/her name to edit a mailing address. In contrast, the recipient could be required to enter only his/her identifier and password.

Referring back to FIG. 1, once recipient 32 has been assigned an identifier (and corresponding identifier value) and has associated a mailing address therewith, sender 34 can send hardcopy mail to recipient 32 by obtaining a copy of the assigned identifier. Specifically, sender 34 can log onto routing system 22 via sender interface 26. Sender 34 will enter the recipient's 32 name or identifier value and be outputted the recipient's 32 identifier. As indicated above, the identifier is a bar code or the like that sender 34 can affix onto a piece of hardcopy mail. As such, sender 34 should be able to print out a copy of the identifier from routing system 22.

Figure 5:
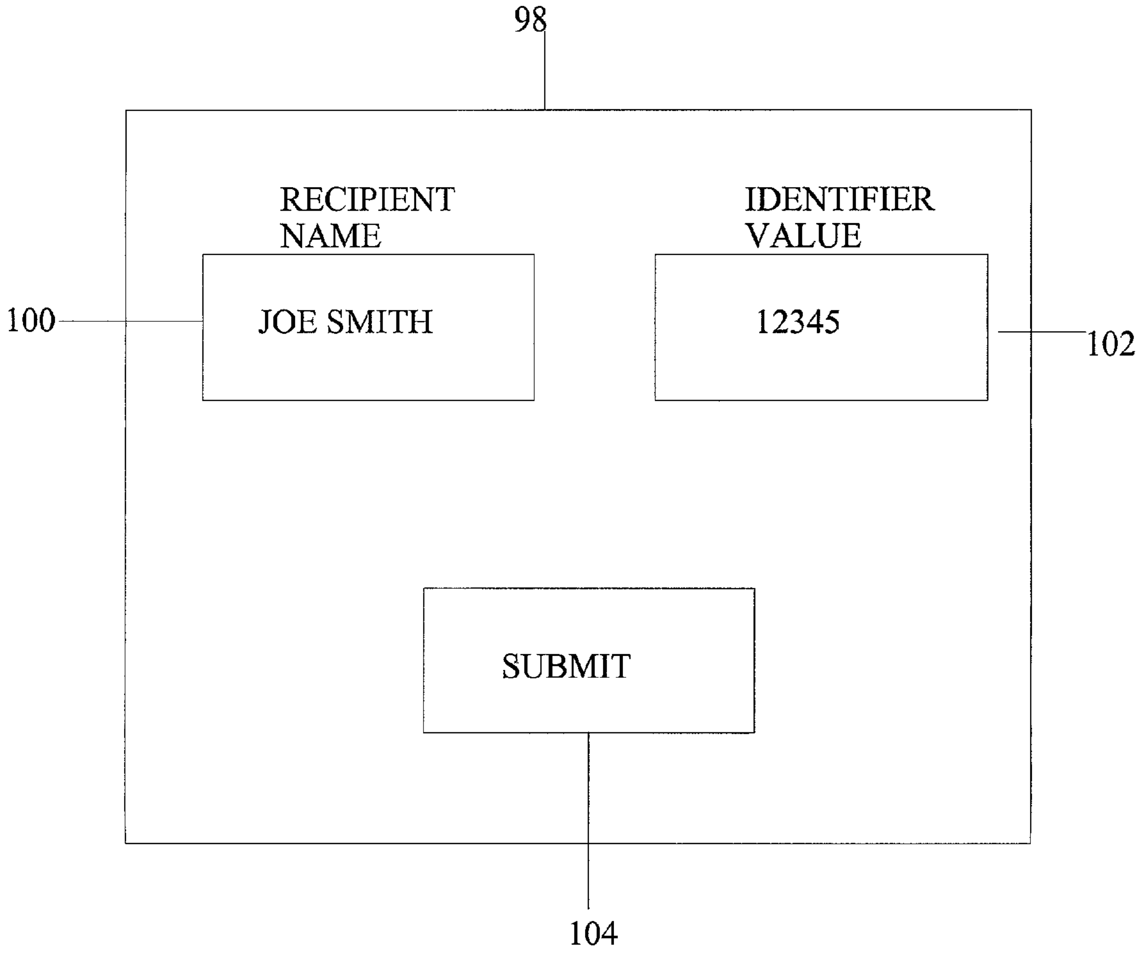
FIG. 5 depicts an identifier request screen of a sender interface.
Figure 6:
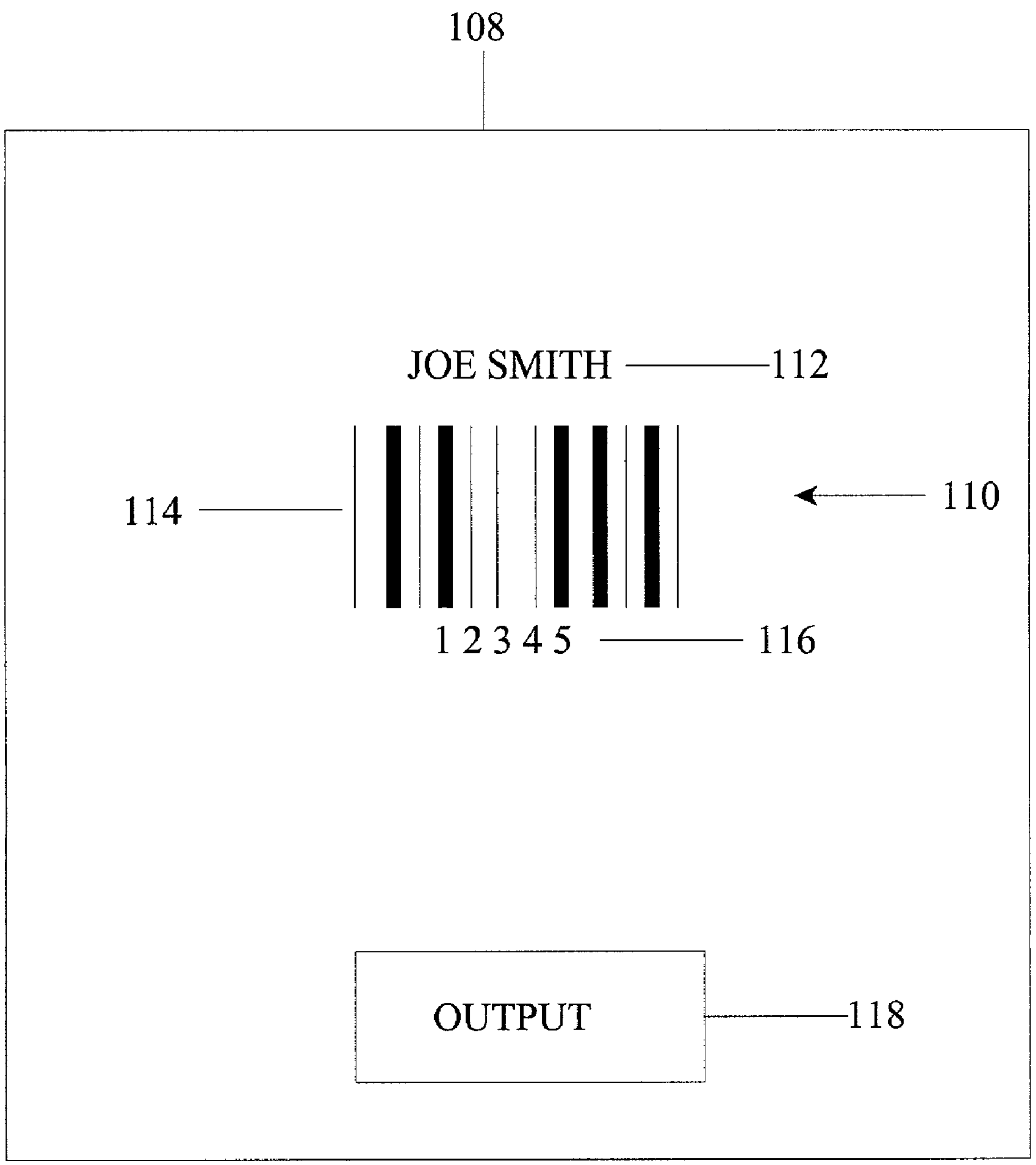
FIG. 6 depicts an identifier display screen of the sender interface.

FIG. 5 depicts an exemplary identifier request screen 98 of sender interface 26. As depicted, identifier request screen 98 includes recipient name field 100, and identifier value field 102. Sender can enter the recipient's name in recipient name field 100 and/or the corresponding identifier value (if known) in identifier value field 102, and then select submit button 104. The database will be searched and the corresponding identifier will be displayed, as shown in the identifier display screen 108 of FIG. 6. As depicted, identifier 110 can include the corresponding recipient's name 112, machine readable (bar) code 114, and identifier value 116. It should be understood that identifier value 116 and recipient name 112 need not be displayed as part of the identifier 110. Such information could be included for quick reference by the sender or the postal machine (as further described below). Sender can then select output button 118 and either download or print out a copy of identifier 110. In a preferred embodiment, sender will print out identifier 110 onto a label or the like that is easily affixable to a piece of hardcopy mail.

Referring back to FIG. 1, once the sender 34 has obtained the identifier, the sender 34 can affix the identifier to a piece of hardcopy mail that he/she desires to route to recipient 32. The piece of hard copy mail will then be routed to a postal worker or machine 36 that will read the affixed identifier. Postal machine 36 will request from routing system 22, the mailing address corresponding to the identifier. Specifically, in a preferred embodiment, postal machine 36 will send a request for a mailing address to cross-reference system 28. The request preferably includes the identifier value for the read identifier. Cross-reference system 28 will then access database 30 and obtain the current mailing address that corresponds to the submitted identifier value. The mailing address will then be sent to postal machine 36, which will route the piece of hardcopy mail to recipient 32 at the mailing address. As indicated above, in a preferred embodiment, the database 30 resembles a table that cross-references identifier values with recipient names, passwords, and mailing addresses. In a second embodiment, the recipient information (i.e., mailing address, identifier, password, etc.) could be periodically sent to postal machine 36 on a scheduled basis. Alternatively, postal machine 36 could store the information locally upon submission by recipient 32. In either event, a request from postal machine 36 to computer system 10 for individual mailing addresses would be obviated.

The present invention thus allows hardcopy mail to be routed to recipient 32 based upon whatever mailing address is currently stored in database 30. This allows recipient 32 to make one address change apply to all potential senders. In previous systems, the mailing address had to be changed with each sender individually. Moreover, the present invention allows an address change to be immediately effective. Thus, the present invention is especially useful not only for recipients who travel on a consistent basis, but also recipients who move. Also, since the identifier assigned to a recipient should rarely or never change (e.g., only upon request by a recipient in view of fraud or the like), a sender could obtain numerous copies of the recipient's identifier for future use without fear of the mail being mis-routed.

As further depicted in FIG. 1, communication with computer system 10 occurs via communication links 38. Communications links 38 can include a direct hardwired connection (e.g., serial port) to the computer system 10, or an addressable connection such as a remote system in a client-server environment. In the case of the latter, the client and server may be connected via the Internet, wide area networks (WAN), local area networks (LAN) or other private networks. The server and client may utilize conventional token ring connectivity, Ethernet, or other conventional communications standards. Where the client is connected to the system server via the Internet, connectivity could be provided by conventional TCP/IP sockets-based protocol. In this instance, the client would utilize an Internet service provider outside the system to establish connectivity to the system server within the system.

It is understood that the present invention can be realized in hardware, software, or a combination of hardware and software. Moreover, any kind of computer/server system(s)—or other apparatus adapted for carrying out the methods described herein—is suited. A typical combination of hardware and software could be a general purpose computer system with a computer program that, when loaded and executed, controls computer system 10 such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

Figure 7:
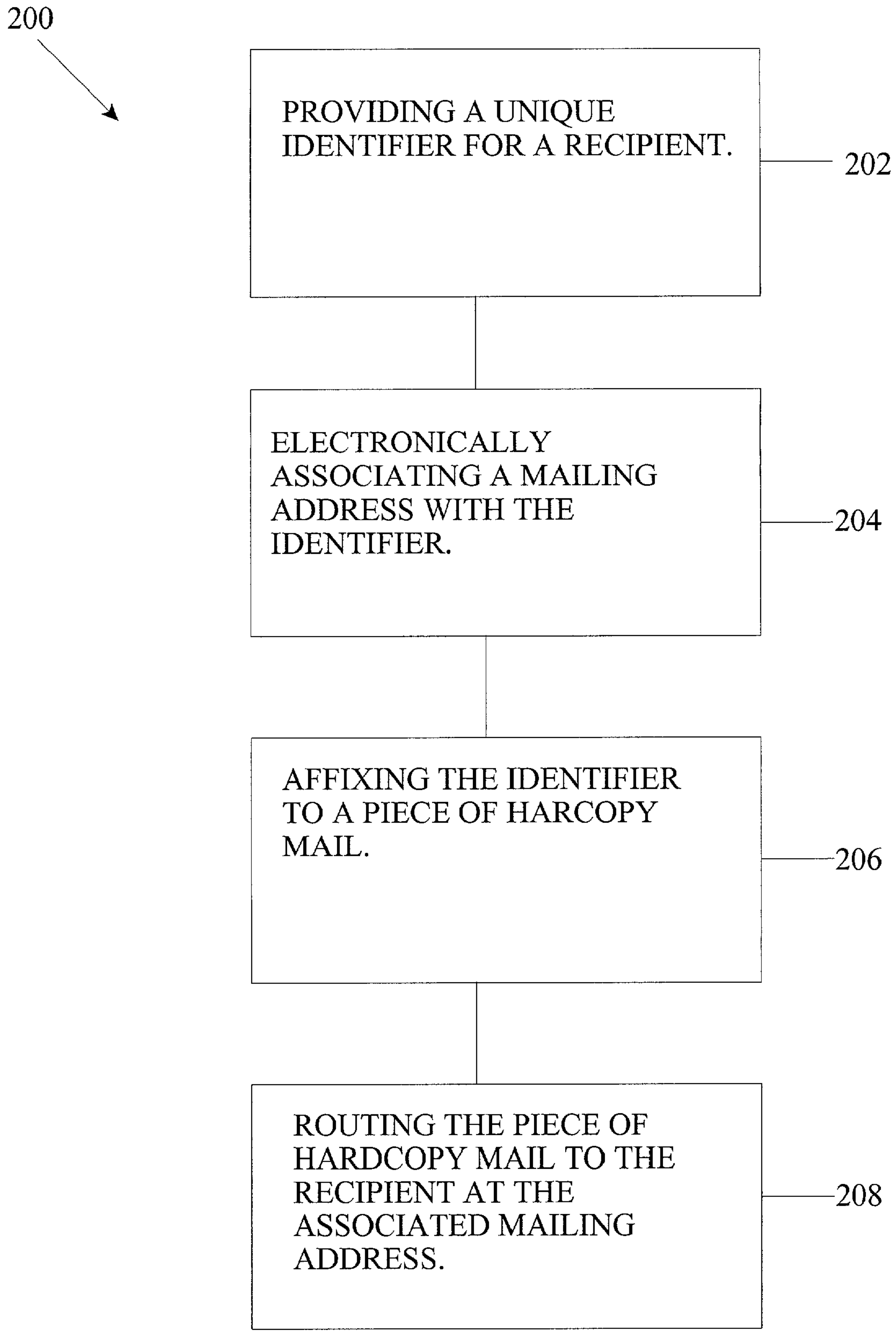
FIG. 7 depicts a method flow chart according to the present invention.

Referring now to FIG. 7, a method 200 according to the present invention is shown. First step 202 is to provide a unique identifier for a recipient. Second step 204 is to electronically associate a mailing address with the identifier. Third step 206 is to affix the identifier to a piece of hardcopy mail. Fourth step 208 of method 200 is to route the piece of hardcopy mail to the recipient at the associated mailing address.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

What is claimed is:

1. A method for routing hardcopy mail, comprising providing a unique identifier for a recipient, in response to entry of a mailing address of the recipient in a routing system electronically associating the mailing address, provided by the recipient, with the identifier in the routing system, the mailing address comprising all information necessary for routing the hardcopy mail to a physical location of the recipient;

providing the identifier to a sender for affixing to a piece of hardcopy mail in lieu of the mailing address in response to a search by the sender for the identifier in the routing system;

retrieving the associated mailing address corresponding to the identifier from a referencing system of the routing system by a postal machine system, the retrieving using only the identifier; and routing the piece of hardcopy mail to the recipient at the most current associated mailing address, wherein the retrieving obviates a request to a computer.

2. The method of claim 1, further comprising electronically editing the associated mailing address.

3. The method of claim 2, wherein the piece of hardcopy mail is routed to the recipient at the edited mailing address.

4. The method of claim 1, wherein the identifier is a machine readable code.

5. The method of claim 4, wherein the machine readable code is a bar code.

6. The method of claim 1, further comprising the step of sending the associated mailing address to the postal machine for routing the piece of hardcopy mail, prior to the routing step.

7. The method of claim 6, wherein the associated mailing address is sent in response to a request by the machine, and wherein the request includes an identifier value corresponding to the identifier.

8. A method for routing hardcopy mail, comprising:

providing a unique identifier for a recipient; in response to entry of a mailing address of the recipient in a routing system electronically associating the mailing address, provided by the recipient, with the identifier in the routing system, the mailing address comprising all information necessary for routing the hardcopy mail to a physical location of the recipient;

providing the identifier to a sender for affixing to a piece of hardcopy mail in lieu of the mailing address and submitting the piece of hardcopy mail to a machine, wherein the providing is in response to a search by the sender for the identifier in the routing system; and retrieving the associated mailing address corresponding to the identifier from a referencing system of the routing system by a postal machine system, the retrieving using only the identifier; and routing the piece of hardcopy mail to the recipient at the most current associated mailing address, wherein the retrieving obviates a request to a computer.

retrieving the mailing address corresponding to the identifier from a referencing system of the routing system to the machine, using only the identifier; and providing the most current mailing address to the machine, wherein the machine can read the identifier and route the piece of hardcopy mail to the recipient at the associated mailing address and wherein the retrieving obviates a request to a computer.

9. The method of claim 8, wherein the identifier is a machine readable code.

10. The method of claim 9, wherein the machine readable code is a bar code.

11. The method of claim 8, wherein the mailing address is a physical postal address.

12. The method of claim 8, wherein the machine is a postal machine.

13. The method of claim 8, further comprising the step of electronically editing the associated mailing address and electronically associating the edited mailing address with the identifier, prior to retrieving the most current mailing address.

14. The method of claim 13, wherein the most current mailing address is the edited mailing address.

15. The method of claim 8, wherein the request includes an identifier value corresponding to the identifier.

16. A method for routing hardcopy mail, comprising the:

providing a unique identifier for a recipient, in response to entry of a mailing address of the recipient in a routing system electronically associating the mailing address, provided by the recipient, with the identifier in the routing system, the mailing address comprising all information necessary for routing the hardcopy mail to a location of the recipient;

providing the identifier to a sender for affixing to a piece of hardcopy mail in lieu of the mailing address in response to a search by the sender for the identifier in the routing system;

electronically editing the associated mailing address;

electronically associating the edited mailing address with the identifier; and sending the edited mailing address to a machine through a referencing system of the routing system by retrieving the edited mailing address using only the identifier, wherein the machine can read the identifier and route the piece of hardcopy mail to the recipient at the edited mailing address and wherein the retrieving obviates a request to a computer.

17. The method of claim 16, wherein the identifier is a machine readable code.

18. The method of claim 17, wherein the machine readable code is a bar code.

19. The method of claim 16, wherein the edited mailing address is sent in response to a request by the machine, and wherein the request includes an identifier value corresponding to the identifier.

20. A system for routing hardcopy mail, comprising:

a recipient interface for electronically associating a mailing address, provided by a recipient, with a unique identifier for the recipient in a routing system, the mailing address comprising all information necessary for routing the hardcopy mail to a location of the recipient;

a sender interface for outputting the identifier to a sender in response to a search by the sender for the identifier in the routing system, wherein the identifier is affixable to a piece of hardcopy mail in lieu of the mailing address;

a cross-reference system for retrieving the associated mailing address using only the identifier; and a routing system for outputting the associated mailing address to a machine for the mailing address corresponding to the identifier, the machine routing the piece of hardcopy mail to the recipient at the associated mailing address, wherein the machine can read the identifier and route the piece of hardcopy mail to the recipient at the associated mailing address and wherein the retrieving obviates a request to a computer.

21. The system of claim 20, wherein the mailing address is a physical postal address.

22. The system of claim 20, wherein the machine is a postal machine.

23. The system of claim 20, wherein the unique identifier is a machine readable code.

24. The system of claim 23, wherein the machine readable code is a bar code.

25. The system of claim 20, wherein the recipient interface allows the associated mailing address to be edited and electronically associated with the identifier.

26. The system of claim 25, wherein the cross-reference system retrieves an edited mailing address and the routing system outputs the edited mailing address to the machine, wherein the machine can read the identifier and route the piece of hardcopy mail to the recipient at the edited address.

27. The system of claim 20, wherein the associated mailing address is outputted in response to a request that includes an identifier value corresponding to the identifier.

28. A system for routing hardcopy mail, comprising:

a recipient interface for electronically designating a mailing address for a recipient in a routing system, provided by the recipient, the mailing address comprising all information necessary for routing the hardcopy mail to a location of the recipient;

a sender interface for outputting a unique identifier corresponding to the recipient to a sender in response to a search by the sender for the identifier in the routing system, wherein the identifier is affixable to a piece of hardcopy mail in lieu of the mailing address;

a cross-reference system for retrieving the designated mailing address using only the identifier; and a routing system for outputting the designated mailing address to a machine in response to a request from the machine for the designated mailing address corresponding to the identifier, wherein the machine reads the identifier and routes the corresponding piece of hardcopy mail to the recipient at the designated mailing address and wherein the retrieving obviates a request to a computer.

29. The system of claim 28, wherein the request includes a value corresponding to the identifier.

30. The system of claim 28, wherein the address is a physical postal address.

31. The system of claim 28, wherein the machine is a postal machine.

32. The system of claim 28, wherein the identifier is a machine readable code.

33. A program product stored on a computer usable medium for routing hardcopy mail, the computer usable medium comprising program code for causing a computer system to perform the following steps:

electronically associating a mailing address, provided by a recipient, with a unique identifier for the recipient, the mailing address comprising all information necessary for routing the hardcopy mail to a location of the recipient;

outputting the identifier to a sender in response to a search by the sender for the identifier in the routing system, wherein the identifier is affixable to a piece of hardcopy mail in lieu of the mailing address; and retrieving from the routing system the associated mailing address using only the identifier; and outputting the associated mailing address from a referencing system of the routing system to a machine associated to a referencing system, wherein the machine can read the identifier and route the piece of hardcopy mail to the recipient at the associated mailing address and wherein the retrieving obviates a request to a computer.

34. The program product of claim 33, wherein the associated mailing address is outputted in response to a request that includes an identifier value corresponding to the identifier.

* * * * *